US008816304B1

(12) United States Patent
Choi et al.

(10) Patent No.: US 8,816,304 B1
(45) Date of Patent: Aug. 26, 2014

(54) STANDARD ELECTROMAGNETIC WAVE FIELD GENERATOR WITH SLIT

(71) Applicant: Electronics and Telecommunications Research Institute, Daejeon (KR)

(72) Inventors: Sung Woong Choi, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/948,621

(22) Filed: Jul. 23, 2013

(30) Foreign Application Priority Data

May 29, 2013 (KR) ........................ 10-2013-0060809

(51) Int. Cl.
*H01J 25/34* (2006.01)
*G01N 29/34* (2006.01)

(52) U.S. Cl.
USPC ......... 250/493.1; 367/128; 702/124; 343/772

(58) Field of Classification Search
USPC ......... 250/493.1; 367/128; 343/772; 702/124
See application file for complete search history.

(56) References Cited

U.S. PATENT DOCUMENTS

| | | | | |
|---|---|---|---|---|
| 4,312,231 | A * | 1/1982 | Kawashima et al. | 73/643 |
| 6,900,765 | B2 * | 5/2005 | Navarro et al. | 343/700 MS |
| 2005/0235814 | A1 * | 10/2005 | Diebold | 86/50 |
| 2013/0006553 | A1 * | 1/2013 | Kwon et al. | 702/57 |

FOREIGN PATENT DOCUMENTS

| | | |
|---|---|---|
| KR | 1995-0011835 | 10/1995 |
| KR | 10-0243090 | 2/2000 |
| KR | 10-2013-0003369 | 1/2013 |

OTHER PUBLICATIONS

Choi, Sung-Woong et al., "Improvement of Electromagnetic Field Distribution in 4-Port TEM cell Using Slit Structure," Conference on the Institute of Electronics Engineers of Korea, vol. 36(1):473-475 (2013).

Jeon, Sangbong et al., "On the New Design of a 4-Port TEM Waveguide with a Higher Cutoff Frequency and Wider Test Volume," ETRI Journal, vol. 34(4):621-624 (2012).

* cited by examiner

*Primary Examiner* — Nikita Wells
(74) *Attorney, Agent, or Firm* — Nelson Mullins Riley & Scarborough LLP; Anthony A. Laurentano, Esq.

(57) ABSTRACT

A standard EM wave field generator, includes a first tapered region configured to have a first port formed on its one side and be supplied with a source to generate EM field through the first port; and a first untapered region configured to have at least one or more slits in the form of a hole. Further, the standard EM wave field generator includes a second tapered region configured to have a third port formed on its one side and output the EM field generated from the first port through the third port.

14 Claims, 6 Drawing Sheets

STANDARD ELECTROMAGNETIC WAVE FIELD GENERATOR WITH SLIT

CROSS-REFERENCE TO RELATED APPLICATION(S)

The present invention claims priority of Korean Patent Application No. 10-2013-0060809, filed on May 29, 2013, which is incorporated herein by reference.

FIELD OF THE INVENTION

The present invention relates to a standard EM (electromagnetic) wave field generator using a slit, and more particularly, to a standard EM wave field generator capable of removing unwanted components that present in a traveling direction of an EM (electromagnetic) field using a slit structure.

BACKGROUND OF THE INVENTION

In recent years, with the rapid development of electrical, electronic and information technologies, many kinds of electronic devices are present. EM (electromagnetic) fields generated from these electronic devices may not only cause problems in the human body, but also affect the electronic devices to induce a malfunction and failure.

Therefore, the development of standard EM wave field generators enhancing a resistance is actively ongoing so radiation of undesired EM fields can be suppressed below a regulation value and a normal operation can be done in an EM field environment with a constant regulation value. In conjunction with a standard EM wave field generator, Korean laid-open publication No. 2013-0003369, published on Jan. 19, 2013, discloses an algorithm which interprets a TEM (Transverse Electro Magnetic) mode distribution using a mode matching technology in order to be used in a tapered area of a TEM cell or performance analysis and design of GTEM (Gigahertz Transverse Electro Magnetic) cell.

However, the Korean laid-open publication provides the standard EM wave field generator, but fails to disclose a technique to remove unwanted field components. That is, because the unwanted field components may occur highly in a direction corresponding to the traveling direction of the EM field, there is a problem when generating a near field mode as well as the TEM mode. Nevertheless, none of the prior arts are silent to describe the solution to the problem as set forth above.

SUMMARY OF THE INVENTION

In view of the above, the present invention provides a standard EM wave field generator with a slit capable of removing unwanted electric field components that may occur within a TEM cell by forming slits on an upper septum and a lower septum in the TEM cell.

A technical problem that an exemplary embodiment attempts to achieve is not limited to the technical problem as described above and other technical problem may be present.

In accordance with an embodiment of the present invention, there is provided standard EM (electromagnetic) field wave field generator, including: a first tapered region configured to have a first port formed on its one side and be supplied with a source to generate EM field through the first port; an first untapered region configured to have at least one or more slits in the form of a hole; and a second tapered region configured to have a third port formed on its one side and output the EM field generated from the first port through the third port.

In accordance with one of the components of the embodiment of the present invention, unwanted components that are present in a traveling direction of the EM fields can be removed. Therefore, it is possible to improve a distribution of EM fields within the TEM cell.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
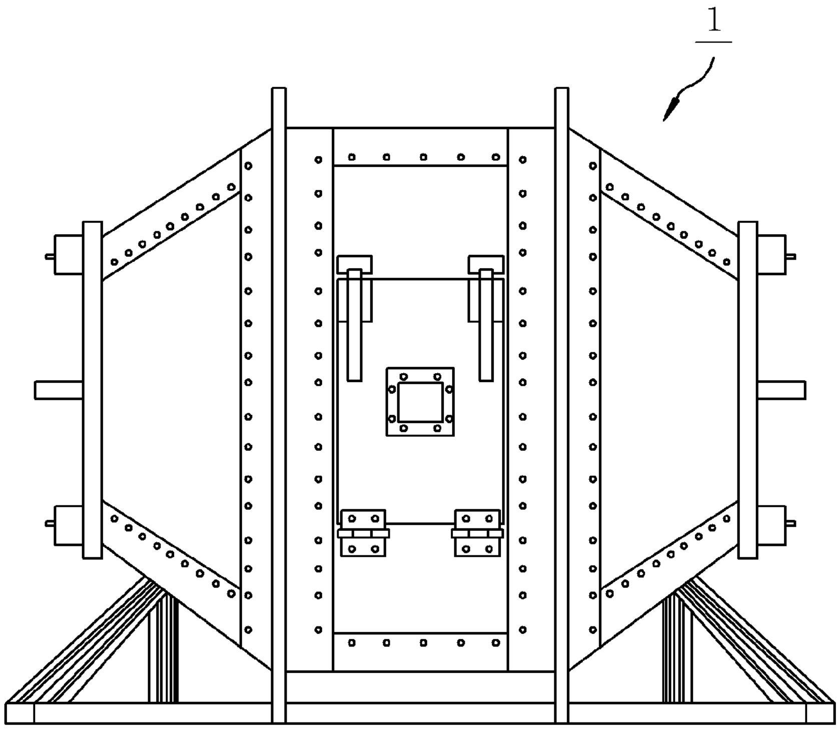
FIG. 1 is a front view of a standard EM wave field generator with one or more slits in accordance with an embodiment of the present invention

Hereinafter, embodiments of the present invention will be described in detail with reference to the accompanying drawings which form a part hereof. However, the present invention may be embodied in different forms, but it is not limited thereto. In the drawings, further, portions unrelated to the description of the present invention will be omitted for clarity of the description and like reference numerals and like components refer to like elements throughout the detailed description.

In the whole specification, when a portion is "connected" to another portion, it means that the portions are not only "connected directly" with each other but they are electrically connected" with each other by way of another device therebetween. Further, when a portion "comprises" a component, it means that the portion does not exclude another component but further comprises other component unless otherwise described. Furthermore, it should be understood that one or more other features or numerals, steps, operations, components, parts or their combinations can be or are not excluded beforehand.

Hereinafter, the embodiments of the present invention will be described in detail with reference to the accompanying drawings.

Figure 2A:
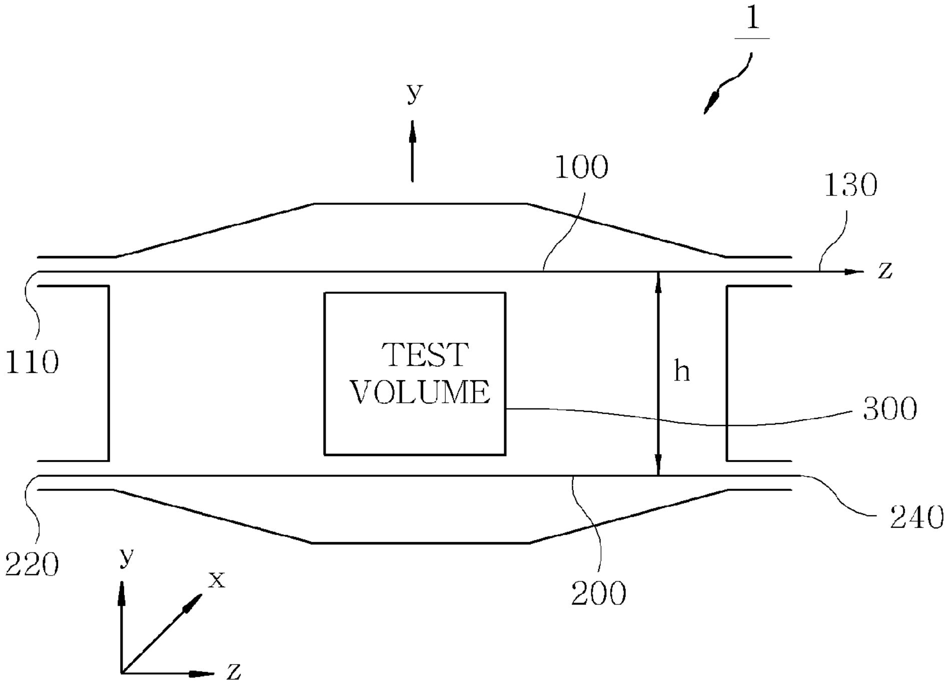
FIGS. 2A and 2B are a front-sectional view and a side-sectional view of the standard EM wave field generator with one or more slits shown in FIG. 1, respectively.
Figure 2B:
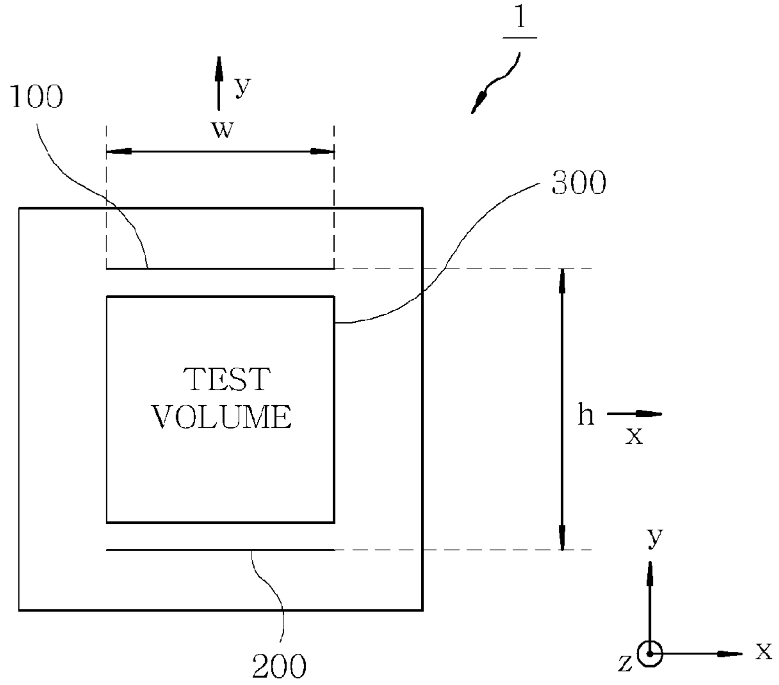

FIG. 1 is a front view of a standard EM wave field generator 1 with one or more slits in accordance with an embodiment of the present invention, and FIGS. 2A and 2B are a front-sectional view and a side-sectional view, respectively, of the standard EM wave field generator 1 shown in FIG. 1. However, the standard EM wave field generator 1 of FIGS. 1 and 2A and 2B is merely an embodiment of the present invention, and thus it should be noted that the present invention is not intended to interpret only with FIGS. 1 and 2.

Referring to FIG. 1, the standard EM wave field generator 1 may be a device used in a field of an EMC (Electro Magnetic Compatibility). In this case, the standard EM wave field generator 1 may be a device is capable of improving a distributed phenomenon of unwanted EM fields of TEM (Transverse Electro Magnetic) cell having two septa. Further, the standard EM wave field generator 1 may be utilized in researches to suppress radiation of unwanted EM fields below a regulation value and strengthen a resistance so that it can operate normally without being hindered in an EM field environment with a certain regulation value.

FIG. 2A is a front-sectional view of the standard EM wave field generator 1, and FIG. 2B is a side-sectional view of the standard EM wave field generator 1. Referring to FIGS. 2A and 2B, the standard EM wave field generator 1 includes an upper septum 100, a first port 110, a third port 130, a test volume 300, a lower septum 200, a second port 220, a fourth port 240. The EM fields are generated in a direction from the first port 110 to the third port 130, and are generated in a direction from the second port 220 to the fourth port 240. The TEM cell having two upper and lower septa 100 and 200 has an exterior which is formed with a perfect conductor with zero potential. Further, the interior of the TEM cell is formed so that the upper septum 100 and the lower septum 200 are ensured not to bend, is implemented so that feed terminals are spaced apart by a predetermined distance to facilitate an impedance matching, and has a structure capable of generating a frequency window with a high Q factor to widen the frequency band in use.

The upper septum 100 and the lower septum 200 are formed in a straight-line structure, and thus, the TEM cell may generate a TEM plane wave between the upper septum 100 and the lower septum 200. The TEM cell may be a device capable of offering an environment where an EM field immunity test can be conducted irrespective of an external EM field environment and near fields can be generated.

Hereinafter, the upper and lower septa 100 and 200 of the standard EM wave field generator 1 will be described in detail.

Figure 3A:
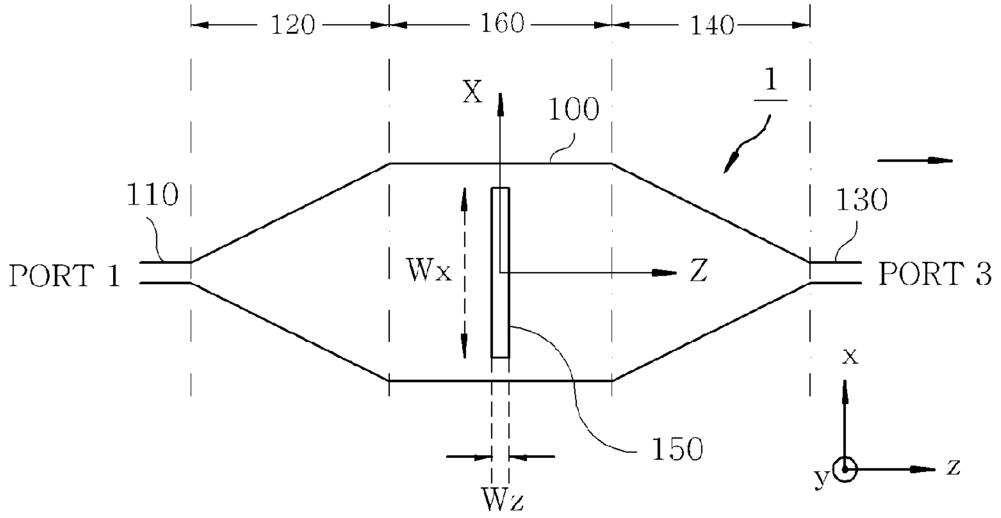
FIGS. 3A and 3B are plan views of an upper septum and a lower septum of the standard EM wave field generator with a slit shown in FIG. 1.
Figure 3B:
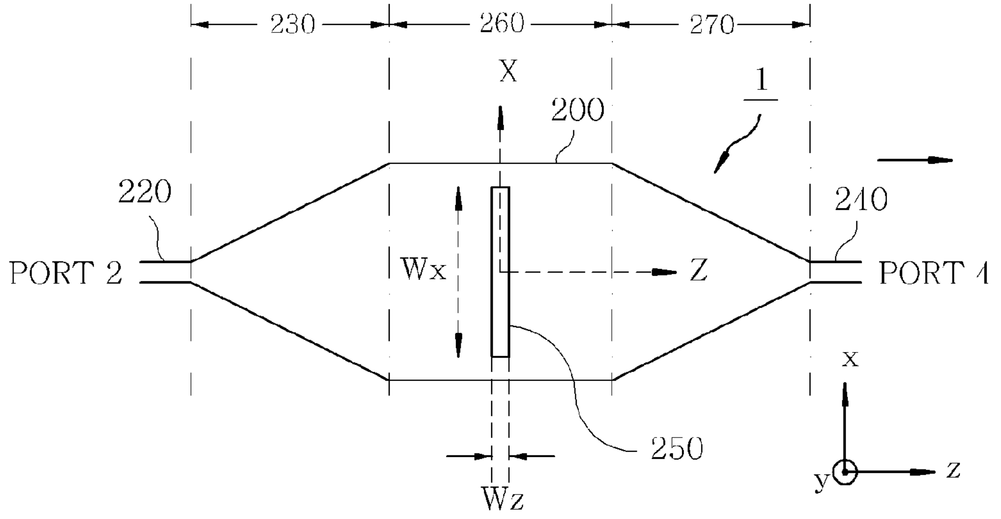
Figure 4A:
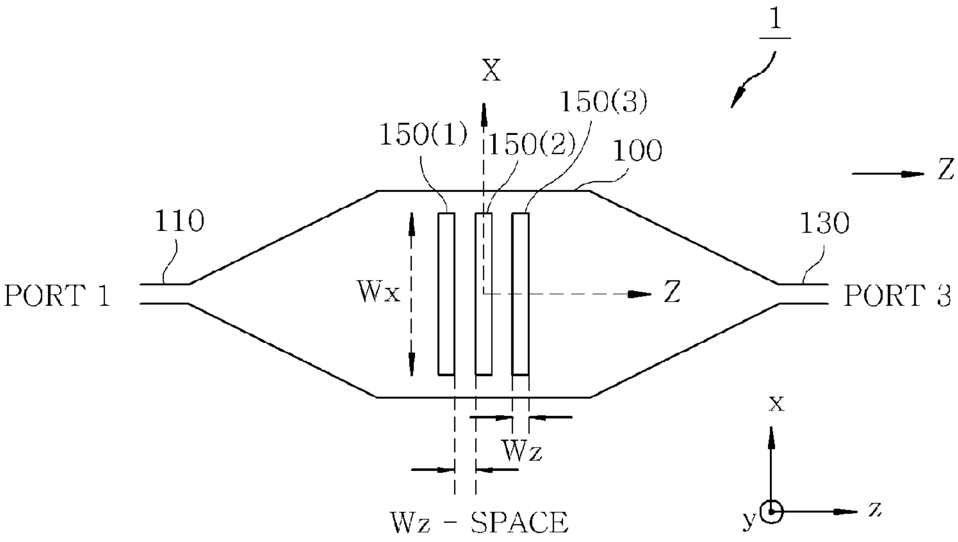
FIGS. 4A and 4B are plan views of an upper septum and a lower septum of the standard EM wave field generator with 3 slits shown in FIG. 1.
Figure 4B:
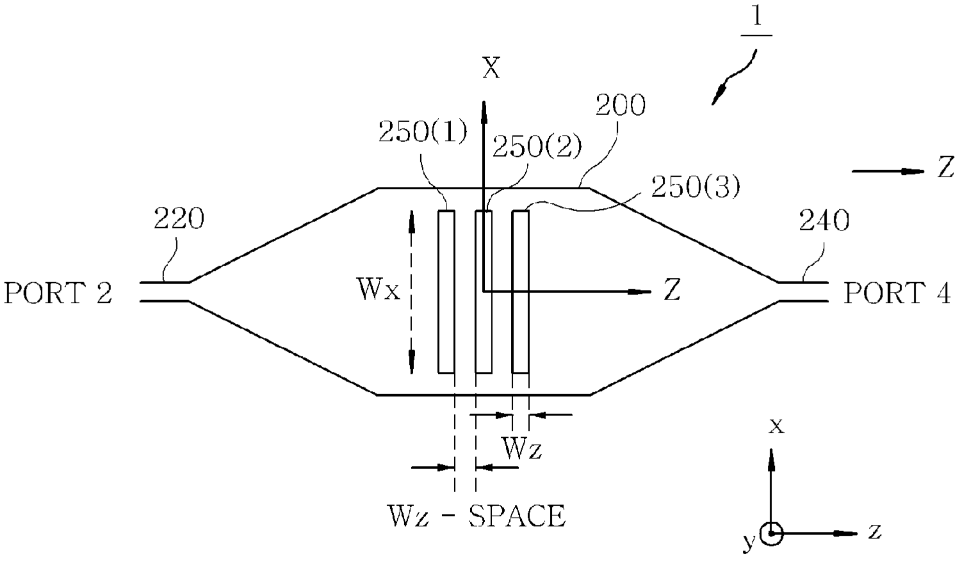

FIGS. 3A and 3B are plan views of the upper septum and a lower septum of the standard EM wave field generator 1 shown in FIG. 1, and FIGS. 4A and 4B are plan views of an upper septum and a lower septum, respectively, in accordance with another embodiment of the present invention.

Referring to FIG. 3A, there is shown the upper septum 100 of the standard EM wave field generator 1. The standard EM wave field generator 1, specifically, the upper septum 100 includes a first tapered region 120, a first untapered region 160 and a second tapered region 140.

The first tapered region 120 is extended from the first port 110 to the first untapered region 160. The term "tapered" used herein is a term used when both sides opposite to each other are inclined symmetrically, and is referred to a shape in which a diameter becomes gradually decreased or increased in several parts. Therefore, the first tapered region 120 may be a section where a diameter becomes gradually increased from the first port 110. In addition, the first tapered region 120 has the first port 110 formed at its one side and becomes a region which is supplied with a source to generate the EM fields through the first port 110.

The first untapered region 160 is called a region where both sides opposite to each other are not inclined symmetrically. The first untapered region 160 has at least one slit 150 formed in a shape of a hole. A length Wx of the at least one slit 150 corresponds to 50% or 91% of a length of the first untapered region 160. Further, a width Wz of the at least one slit 150 corresponds to 1% to 10% of a width of the first untapered region 160. In this embodiment, the at least one slit 150 is formed in a longitudinal direction which is perpendicular to a traveling direction of the EM fields. In this regard, the EM fields may travel in a direction from the first port 110 to the third port 130. In other words, the longitudinal direction of the at least one slit 150 may be a back or rear direction (x-direction) with a base of the front of the standard EM wave field generator 1. The at least one slit 150 are formed in a form of an elongated rectangular hole.

The second tapered region 140 extends from the first tapered region to the third port 130. Further, the second tapered region has the third port 130 formed at its one side and becomes a region which outputs an EM field generated from the first port 110 through the third port 130.

The first tapered region 120, the first untapered region 160 and the second tapered region are integrally formed to constitute the upper septum 100 of the TEM cell. The first tapered region, the first untapered region and the second tapered region have the same width.

FIG. 3B shows the lower septum 200 of the standard EM wave field generator 1. The standard EM wave field generator 1, specifically, the lower septum 200 includes a third tapered region 230, a second untapered region 260 and a fourth tapered region 270.

The third tapered region 230 is extended from the second port 220 to the second untapered region 260. The third tapered region 230 may be a section where a diameter becomes gradually increased from the second port 220. In addition, the third tapered region 230 has the second port 220 formed at its one side and becomes a region which is supplied with a source to generate the EM field through the second port 220.

The second untapered region 260 includes a region where both sides opposite to each other are not inclined symmetrically. The second untapered region 260 has at least one slit 250 formed in a shape of a hole. A length Wx of the at least slit 250 corresponds to 50% or 91% of a length of the second untapered region 260. Further, a width Wz of the at least slit 250 corresponds to 1% to 10% of a width of the second untapered region 260. In this embodiment, the at least one slit 250 is formed in a longitudinal direction which is perpendicular to a traveling direction of the EM fields. In this regard, the EM fields may travel in a direction from the second port 220 to the fourth port 240. In other words, the longitudinal direction of the at least slit 250 may be a back or rear direction (x-direction) with a base of the front of the standard EM wave field generator 1. The slit 250 is formed in a form of an elongated rectangular hole.

The fourth tapered region 270 extends from the second untapered region 260 to the fourth port 240. Further, the fourth tapered region 270 has the fourth port 240 at its one side and becomes a region which outputs an EM field generated from the second port 220 through the fourth port 240.

The third tapered region 230, the second untapered region 260 and the fourth tapered region are integrally formed to constitute the lower septum 200 of the TEM cell. The third tapered region 230, the second untapered region 260 and the fourth tapered region 270 have the same width.

The upper septum 100 and the lower septum 200 form a symmetrical structure with each other and are arranged at an upper side and lower side, respectively, with the test volume 300 therebetween.

FIG. 4A illustrates another embodiment of the upper septum 100 of the standard EM wave field generator 1, and FIG.

4B illustrates another embodiment of the lower septum 200 of the standard EM wave field generator 1. The upper and lower septa illustrated in FIGS. 4A and 4B, have structures that are symmetrical with each other and are identical to each other in their shapes and sizes except their names. Therefore, a following description will be made on the upper septum illustrated in FIG. 4A.

Referring to FIG. 4A, at least one or more slits 150(1), 150(2) and 150(3) are formed to be spaced apart with one another at a regular interval. A constant spacing Wz_space between the slits may be identical to the width of the slits or less than the width of the slit. Alternatively, the constant spacing Wz_space between the slits may be identical to a width of the slits or greater than a width of the slits. In FIG. 4A, although only three slits 150(1), 150(2) and 150(3) are shown, the number of the slits may be more than three or less than three. The number of the slits may increase or decrease depending on how many unwanted electric fields Ey are formed along a traveling direction of a Z-axis.

The term "TEM mode" used herein is called a state where electric fields and magnetic fields are formed in a perpendicular direction with each other and the EM fields travel in a perpendicular direction to both the electric fields and the magnetic fields. That is, as shown in FIG. 4A, the traveling direction of an EM field is a z-axis direction, an electric field is formed in a y-axis direction, and a magnetic field is formed in an x-axis direction. In this case, when the electric field is formed in the x-axis direction or the z-axis direction, it is an unintended electric field; therefore, a component of the unintended electric field is needed to be removed. Similarly, when the magnetic field is formed in the y-axis direction or the z-axis direction, it is also an unintended magnetic field; therefore, a component of the unintended magnetic field is needed to be removed.

Accordingly, the standard EM wave field generator 1 in accordance with the embodiments of the present invention enables a component of unwanted electric field intensity not to produce in the z-axis corresponding to the traveling direction of the EM field and to generate a TEM mode and a near field mode without unwanted component.

Figure 5:
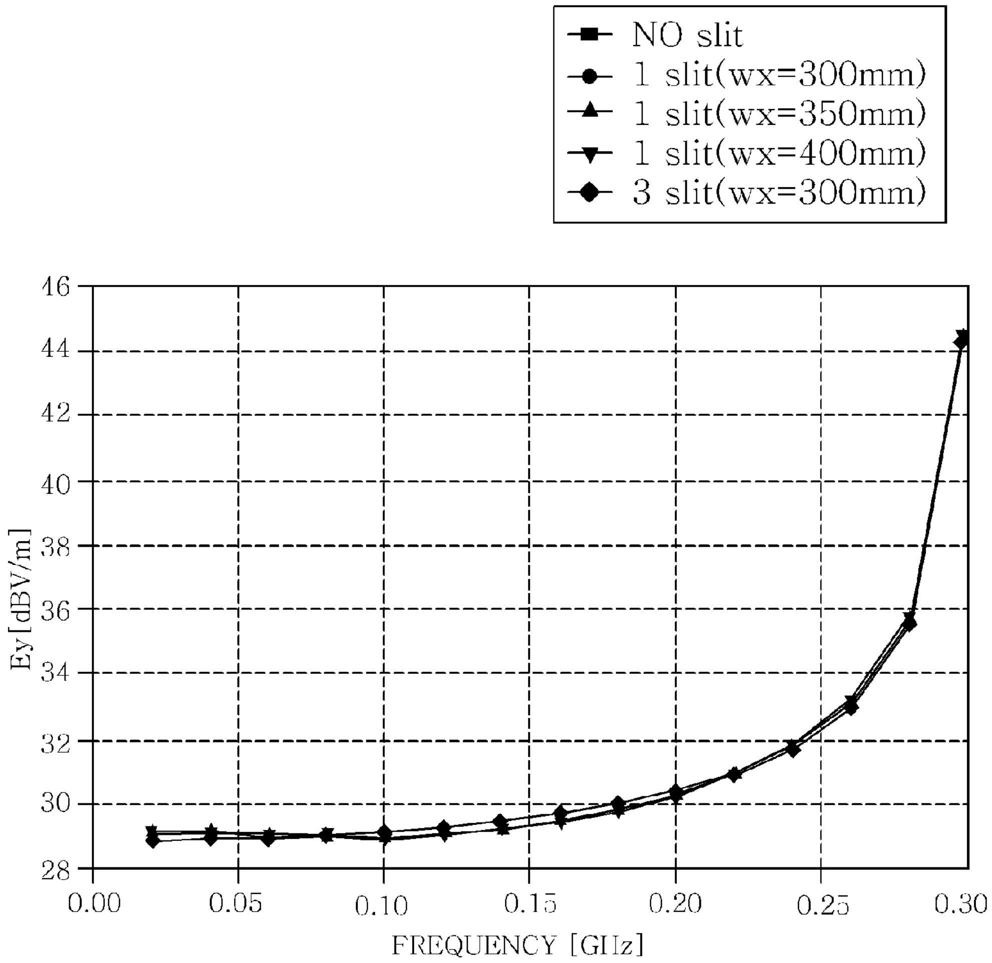
FIG. 5 is a graph illustrating an intensity of intended electric fields of a standard EM wave field generator with one or more slits in accordance with an embodiment of the present invention.
Figure 6:
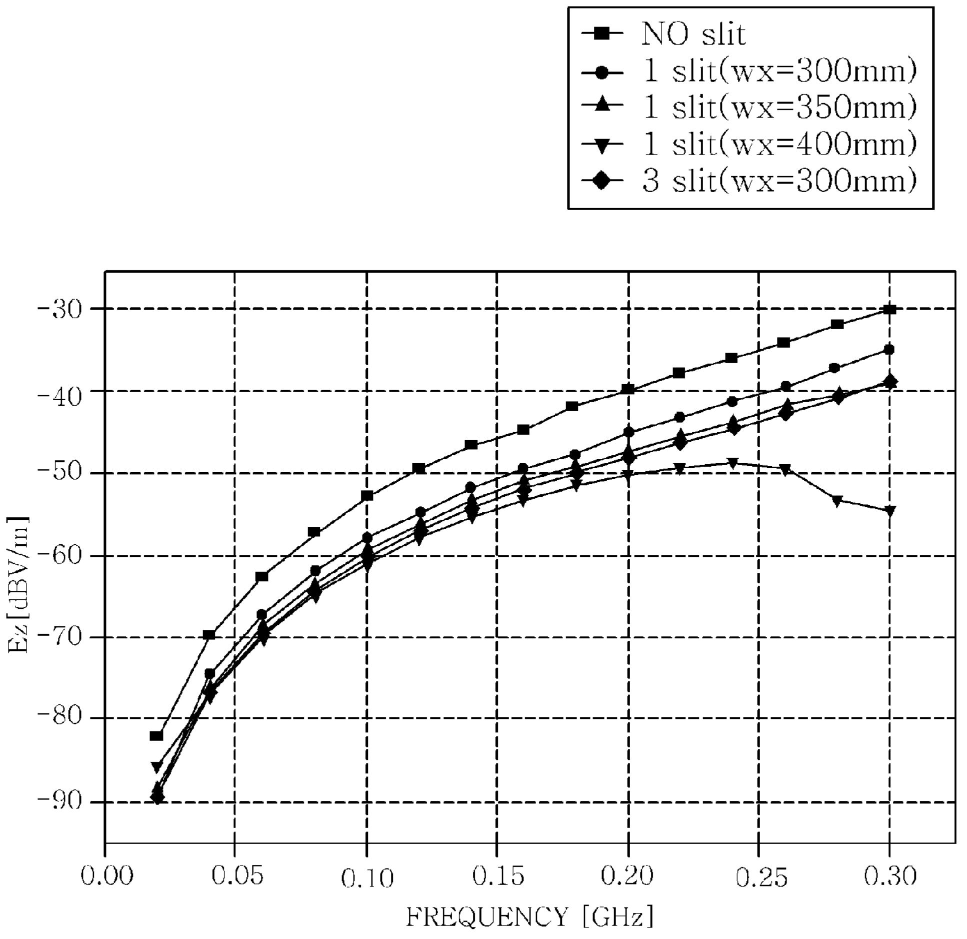
FIG. 6 is a graph illustrating an intensity of unintended electric fields of a standard EM wave field generator with one or more slits in accordance with another embodiment of the present invention.

FIG. 5 is a graph illustrating an intended electric field intensity of the standard EM wave field generator in accordance with an embodiment of the present invention, and FIG. 6 is a graph illustrating an unintended electric field intensity of a standard EM wave field generator with one or 3 slits in accordance with another embodiment of the present invention.

Referring to FIG. 5, there is shown an electric field (Ey) intensity in a y-axis direction depending on the magnitude of frequency. In this case, since the electric field Ey in the y-axis is an intended electric field, it is preferred that a component of the electric field Ey remains unchanged if possible irrespective of the presence or absent of the slit(s). As can be seen from FIG. 5, it is observed that all the components of the electric field Ey have the same electric field intensity in a case of "No slit" where none of slits are formed, in a case of "1 slit" where one slit is formed, in a case of "2 slit" where two slits are formed, in a case of "3 slits" where three slits are formed, in a case of "1 slit (Wx=350 mm)" where the length of the slit increases, and in a case of "1 slit (Wx=400 mm)" where the length of the slit increases.

Referring to FIG. 6, there is shown a electric field Ez intensity in a z-axis direction depending on the magnitude of frequency. In this case, since the electric field Ez in the z-axis is an unintended electric field, it is preferred that a component of the electric field Ez is needed to remove if any slit is present. As can be seen from FIG. 6, when a case of "No slit" where none of slits is formed is compared with a case of "1 slit (Wx=400 mm)" where one slit with a length of 400 mm is formed, the component of the electric field Ez of these cases exhibits a difference of about 4.1 dBV/m with as a base of 0.15 GHz. Further, it can be observed that a case where even any one of the slits is formed is lower than a case where of "No slit" in the component of the electric field Ez. In addition, it can be also known that when the slits are the same in their lengths, the more the number of the slits is, the more the components of the unintended electric fields are removed; and when the slits are the same in their numbers, the longer the length of the slits is, the more the components of the unintended electric fields are removed.

Moreover, it can be known that a electric field Ez intensity in a case where a slit is formed to have a length of 300 mm, 350 mm and 400 mm is reduced by about 1.9 dBV/m, 3.3 dBV/m and 5.3 dBV, respectively, relative to a case where none of slits are formed, with a base of 0.15 GHz.

As such, the amount of reduction in the electric field when the magnitude of frequency is changed differently is listed in a TABLE 1 as below.

TABLE 1

| Structure of slit | | Frequency | | | | | |
|---|---|---|---|---|---|---|---|
| | | 100 MHz | | 150 MHz | | 200 MHz | |
| | | Ez (dBV/m) | Reduction amount (dB) | Ez (dBV/m) | Reduction amount (dB) | Ez (dBV/m) | Reduction amount (dB) |
| No slit | | −56.4 | — | −48.9 | — | −43.3 | — |
| 1 slit | Wx = 300 | −58.2 | 1.8 | −50.8 | 1.9 | −45.4 | 2.1 |
| | Wx = 350 | −59.3 | 2.9 | −52.2 | 3.3 | −47.1 | 3.8 |
| | Wx = 400 | −61.0 | 4.6 | −54.2 | 5.3 | −50.2 | 6.9 |
| 3 slit | Wx = 300 | −60.1 | 3.7 | −53.0 | 4.1 | −47.8 | 4.5 |

As described above, in accordance with the embodiment of the present invention, it is possible to reduce the component traveling in an unnecessary direction that occur in a TEM cell having two septa used as a standard EM wave field generator, which is one of the drawbacks of the TEM cell. Further, it is possible to decrease the component of fields traveling in an unnecessary direction without the change in the component of the fields through a simulation and to improve the distribution of EM fields within the TEM cell.

The explanation as set forth above is merely described the embodiments of the present invention, and it will be understood by those skilled in the art to which this invention belongs that various changes and modifications may be readily made without changing the technical idea or essential features of the embodiments of the present invention.

Therefore, the exemplary embodiments disclosed herein should be understood to be illustrative not to be limited all the aspects. For example, respective components described to be one body may be implemented separately from one another, and likewise components described separate from one another may be implemented in an integrated type.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A standard EM wave field generator, comprising:
- a first tapered region configured to have a first port formed on its one side and be supplied with a source to generate EM field through the first port;
- a first untapered region configured to have at least one or more slits in the form of a hole; and
- a second tapered region configured to have a third port formed on its one side and output the EM field generated from the first port through the third port.

2. The standard EM wave field generator of claim 1, wherein the at least one or more slits have a length between 50% and 91% of a length of the first untapered region.

3. The standard EM wave field generator of claim 1, wherein the at least one or more slits have a width between 1% and 10% of a width the first untapered region.

4. The standard EM wave field generator of claim 1, wherein the at least one or more slits are formed to be spaced apart at a regular interval.

5. The standard EM wave field generator of claim 1, wherein the EM field travels in a direction of the first port to the third port, and a longitudinal direction of the at least one or more slits is formed to be a perpendicular to the traveling direction of the EM field.

6. The standard EM wave field generator of claim 1, wherein the first tapered region, the first untapered region and the second tapered region are integrally formed to constitute an upper septum of a TEM cell.

7. The standard EM wave field generator of claim 1, wherein the first tapered region, the first untapered region and the second tapered region have the same width.

8. The standard EM wave field generator of claim 1, further comprising:
- a third tapered region configured to have a second port formed on its one side and be supplied with a source to generate an EM field through the second port;
- a second untapered region configured to have at least one or more slits in the form of a hole; and
- a fourth tapered region configured to have a fourth port formed on its one side and output the EM field generated from the second port through the fourth port.

9. The standard EM wave field generator of claim 8, wherein the third tapered region, the second untapered region and the fourth tapered region are integrally formed to constitute a lower septum of a TEM cell.

10. The standard EM wave field generator of claim 8, wherein the at least one or more slits have a length between 50% and 91% of a length of the second untapered region.

11. The standard EM wave field generator of claim 8, wherein the at least one or more slits have a width between 1% and 10% of a width of the second untapered region.

12. The standard EM wave field generator of claim 8, wherein the at least one or more slits are formed to be spaced apart at a regular interval.

13. The standard EM wave field generator of claim 8, wherein the EM field travels in a direction of the second port to the fourth port, and a longitudinal direction of the at least one or more slits is formed to be a perpendicular to the traveling direction of the EM field.

14. The standard EM wave field generator of claim 8, wherein the first tapered region, the first untapered region and the second tapered region are symmetrical to the third tapered region, the second untapered region and the fourth tapered region, respectively.

* * * * *